United States Patent
Roth et al.

(10) Patent No.: US 7,676,367 B2
(45) Date of Patent: Mar. 9, 2010

(54) METHOD OF PRODUCING ALTERNATE UTTERANCE HYPOTHESES USING AUXILIARY INFORMATION ON CLOSE COMPETITORS

(75) Inventors: Robert Roth, Newton, MA (US); Arkady Khasin, Acton, MA (US); Laurence S. Gillick, Newton, MA (US)

(73) Assignee: Voice Signal Technologies, Inc., Woburn, MA (US)

( * ) Notice: Subject to any disclaimer, the term of this patent is extended or adjusted under 35 U.S.C. 154(b) by 1510 days.

(21) Appl. No.: 10/783,518

(22) Filed: Feb. 20, 2004

(65) Prior Publication Data

US 2005/0108012 A1    May 19, 2005

Related U.S. Application Data

(60) Provisional application No. 60/449,195, filed on Feb. 21, 2003.

(51) Int. Cl.
*G10L 15/04* (2006.01)
*G10L 15/00* (2006.01)

(52) U.S. Cl. .................. 704/252; 704/251; 704/231
(58) Field of Classification Search .............. 704/231, 704/251, 252, 254, 257
See application file for complete search history.

(56) References Cited

U.S. PATENT DOCUMENTS

| | | | | |
|---|---|---|---|---|
| 5,369,727 A * | 11/1994 | Nomura et al. | ............. | 704/252 |
| 5,680,511 A * | 10/1997 | Baker et al. | ............. | 704/257 |
| 5,712,957 A * | 1/1998 | Waibel et al. | ............. | 704/240 |
| 5,805,772 A * | 9/1998 | Chou et al. | ............. | 704/255 |
| 5,822,728 A * | 10/1998 | Applebaum et al. | ............. | 704/254 |
| 5,829,000 A * | 10/1998 | Huang et al. | ............. | 704/252 |
| 5,855,000 A | 12/1998 | Waibel et al. | | |
| 5,875,425 A * | 2/1999 | Nakamura et al. | ............. | 704/231 |
| 5,950,160 A * | 9/1999 | Rozak | ............. | 704/252 |
| 5,987,409 A * | 11/1999 | Tran et al. | ............. | 704/240 |
| 6,137,863 A * | 10/2000 | Brown et al. | ............. | 379/88.01 |
| 6,243,680 B1 | 6/2001 | Gupta et al. | | |
| 6,363,347 B1 * | 3/2002 | Rozak | ............. | 704/244 |
| 6,389,394 B1 | 5/2002 | Fanty | | |
| 6,418,328 B1 * | 7/2002 | Shon | ............. | 455/563 |
| 6,754,625 B2 * | 6/2004 | Olsen et al. | ............. | 704/235 |
| 6,760,702 B2 * | 7/2004 | Chien et al. | ............. | 704/251 |
| 6,766,069 B1 * | 7/2004 | Dance et al. | ............. | 382/309 |
| 6,910,012 B2 * | 6/2005 | Hartley et al. | ............. | 704/243 |

(Continued)

FOREIGN PATENT DOCUMENTS

EP    0 984 430 A2    3/2000

*Primary Examiner*—Michael N Opsasnick
*Assistant Examiner*—Douglas C Godbold
(74) *Attorney, Agent, or Firm*—Wilmer Cutler Pickering Hale & Dorr LLP.

(57) ABSTRACT

A method of constructing a list of alternate transcripts from a recognized transcript includes generating a list of close call records, matching partial sub-histories from the recognized transcript with one of the history pairs stored in each of the records, and substituting the other of the history pairs for the partial sub-history of the recognized transcript. A close call record is generated each time a pair of partial hypotheses attempt to seed a common word. Each close call record includes history information and scoring information associated with a particular pair of partial hypotheses seeding a common word. Alternate transcripts are constructed by substituting close call histories for partial histories of the recognized transcripts, and also by substituting close call histories for partial histories of other alternate transcript.

30 Claims, 4 Drawing Sheets

U.S. PATENT DOCUMENTS

| | | |
|---|---|---|
| 6,912,498 B2 * | 6/2005 | Stevens et al. ............... 704/235 |
| 7,149,970 B1 * | 12/2006 | Pratley et al. ............... 715/533 |
| 2002/0052742 A1 | 5/2002 | Thrasher et al. |
| 2002/0184019 A1 | 12/2002 | Hartley et al. |
| 2004/0049388 A1 * | 3/2004 | Roth et al. ................... 704/251 |
| 2005/0043949 A1 * | 2/2005 | Roth et al. ................... 704/251 |

* cited by examiner

US 7,676,367 B2

METHOD OF PRODUCING ALTERNATE UTTERANCE HYPOTHESES USING AUXILIARY INFORMATION ON CLOSE COMPETITORS

CROSS-REFERENCE TO RELATED APPLICATIONS

This application claims benefit U.S. Provisional Patent Application Ser. No. 60/449,195, filed Feb. 21, 2003.

BACKGROUND OF THE INVENTION

The present invention relates to methods and systems for recognizing acoustic utterances, and more particularly, to generating alternate versions of a decoded utterance.

Handheld electronic devices (e.g., mobile phones, PDAs, etc., referred to herein as "handhelds") typically provide for user input via a keypad or similar interface, through which the user manually enters commands and/or alphanumeric data. Manually entering information may require the user to divert his attention from potentially critical activities (e.g., driving). One solution has been to equip the handheld with an embedded speech recognizer. In some cases, the speech recognizer may recognize only a constrained data set, such as a finite list of names or phone numbers; in other cases it may be able to recognize speech without constraint, for example in a dictation mode limited only by a set of valid words and rules of grammar.

Due to environmental noise, limitations in the handheld's audio receiver, and more significantly, due to limitations in computing power of the handheld, the speech recognizer may occasionally incorrectly decode the utterance from the user. To deal with such errors, some speech recognizers generate a list of N alternatives for the decoded utterance, referred to herein as the choice list (also known in the art as an N-best list), from which the user may choose the correct version.

Although there are several known techniques for creating a list of alternative utterances, such techniques tend to work best on platforms with significant processing power and relatively large amounts of available memory. Implementing these techniques on hand held platforms having limited memory resources and processing power reduces the effectiveness of the techniques.

SUMMARY OF THE INVENTION

One advantage of the described embodiment is a reduction of memory requirements over the other prior art techniques described herein, which typically store significantly more information than the relatively small number of close call records needed for the described embodiment. Furthermore, the memory requirements of such prior art techniques increase with the length of the utterance, while the described embodiment works well with a buffer size that is independent of the length of the utterance. Finally, the described embodiment degrades gradually as the size of the close call buffer decreases. By contrast, the choice list degrades dramatically when the amount of data available for saving exceeds the preset size of the buffers in prior art systems.

In one embodiment, a method of constructing a choice list of alternate versions of a recognized transcript from a speech recognition system includes generating, during speech recognition, a list of close call records. Each record includes histories for each of two competing partial hypotheses. The method further includes initializing the close call list from the output of the speech recognition system, selecting one of the close call records from the close call list, selecting a transcript from the choice list, and determining whether one of the two histories for the selected record matches a partial subhistory of the transcript from the choice list. If one of the two histories for the selected close call record matches a partial subhistory of the transcript, the method includes substituting the other of the two histories for the partial subhistory of the transcript to generate an alternative version of the transcript, and adding the alternative version of the transcript to the choice list.

The competing partial hypotheses are word-ending hypotheses that are both seeding a common word. The close call record selected from the close call list is compared against each transcript in the choice list. Each of the close call records includes a close call score difference between the competing hypotheses. The score difference is used to construct the choice list. Each transcript in the choice list includes a transcript score. The transcript score is computed by adding the close call score difference to the transcript score of the transcript into which the other of the two histories was substituted. The list of close call records is limited to a preset maximum number of close call records.

The choice list is initialized with the recognized transcript. The choice list may alternately be initialized with all active, legal word ending hypotheses.

Each of the close call records includes a global score difference between the competitor hypothesis and the score of the globally best hypothesis at the time the close call record is added. The close call score difference is used to determine which close calls to keep if the preset number of close call records is reached.

Each of the close call records includes a close call score difference between the competing hypotheses. The close call difference is used to construct the choice list.

In another embodiment, a computer readable medium includes stored instructions adapted for execution on a processor for carrying out the above-described method.

In another embodiment, a computer readable medium includes stored instructions adapted for execution on a processor includes instructions for generating a list of close call records. Each record includes history information and scoring information associated with a particular pair of partial hypotheses seeding a common word. The medium further includes instructions for generating one or more alternate transcripts from the list of close call records by evaluating each record in the list for a match between a partial subhistory of the recognized transcript and one of the histories stored in the record, and upon finding such a match, substituting the other of the histories stored in the record for the partial sub-history in the recognized transcript. The medium also includes instructions for storing the one or more alternate trancripts in a choice list.

The medium is disposed within a mobile telephone apparatus and operates in conjunction with a user interface. Alternately, the medium may be disposed within a handheld electronic apparatus and operates in conjunction with a user interface.

DESCRIPTION OF THE PREFERRED EMBODIMENTS

The described embodiment is a cellular telephone with embedded speech recognition functionality that allows a user to bypass the manual keypad and enter commands and data via spoken words. The speech recognition functionality further provides to the user, for each decoded transcript (i.e., the text of the recognized utterance the speech recognition functionality provides), a list of alternate choices from which to choose. The user may select a different decoded transcript from the list of alternatives in the event the recognizer incorrectly decodes the utterance. Embedded application software in the cellular telephone provides the speech recognition functionality.

Figure 1:
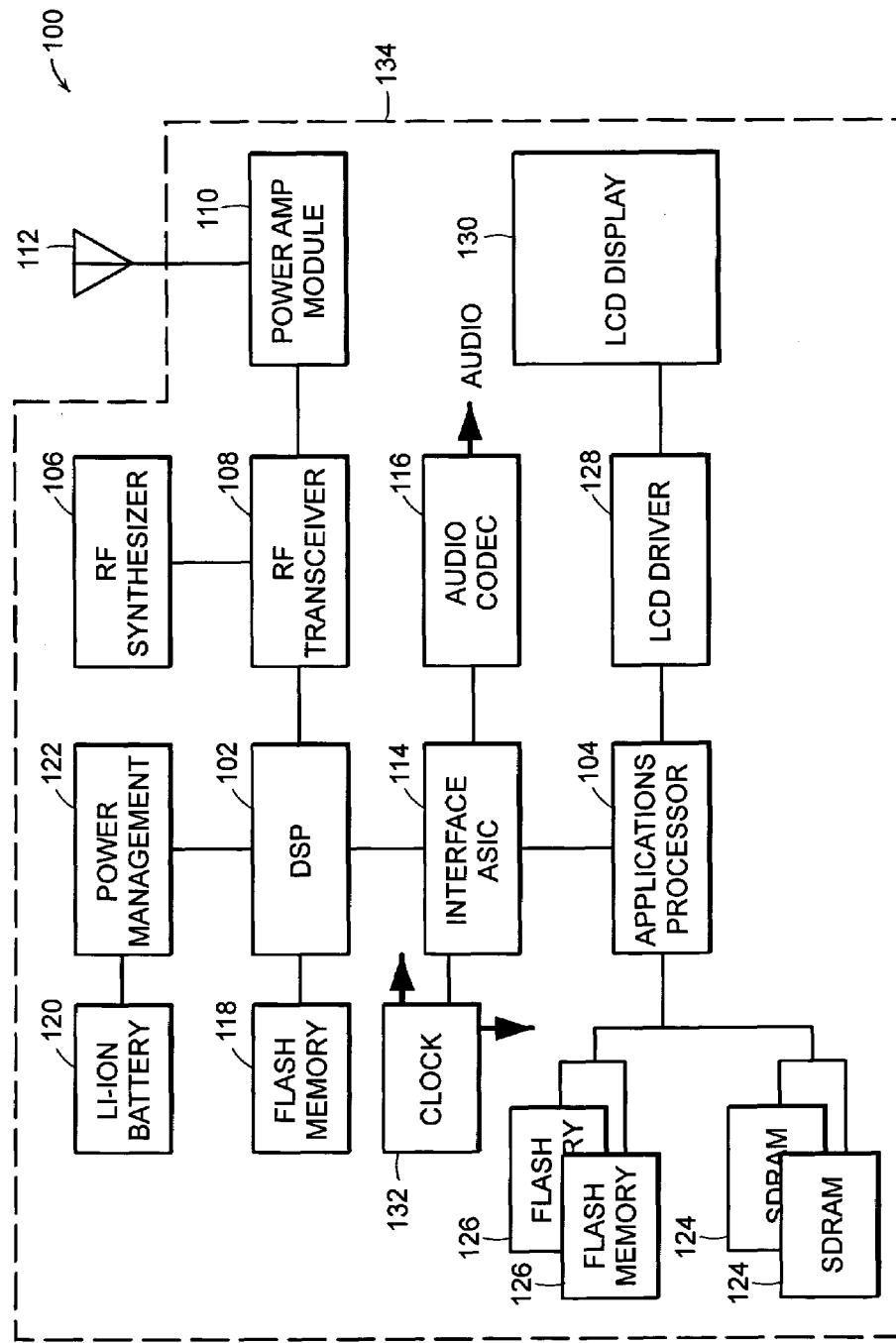
FIG. 1 shows a high-level block diagram of a smartphone.

A smartphone 100, such as is illustrated in the high-level block diagram form in FIG. 1, is a typical platform that can provide such speech recognition functionality via embedded application software. In fact, the described method of generating alternate decoded transcripts may also be implemented in other portable phones, and in other hand held devices in general. Such devices increasingly benefit from the described method as memory and processing constraints increase.

One example of a smartphone 100 is a Microsoft PocketPC-powered phone which includes at its core a baseband DSP 102 (digital signal processor) for handling the cellular communication functions (including for example voiceband and channel coding functions) and an applications processor 104 (e.g. Intel StrongArm SA-1110) on which the PocketPC operating system runs. The phone supports GSM voice calls, SMS (Short Messaging Service) text messaging, wireless email, and desktop-like web browsing along with more traditional PDA features.

An RF synthesizer 106 and an RF radio transceiver 108, followed by a power amplifier module 110 implement the transmit and receive functions. The power amplifier module handles the final-stage RF transmit duties through an antenna 112 An interface ASIC 114 and an audio CODEC 116 provide interfaces to a speaker, a microphone, and other input/output devices provided in the phone such as a numeric or alphanumeric keypad (not shown) for entering commands and information.

DSP 102 uses a flash memory 118 for code store. A Li-Ion (lithium-ion) battery 120 powers the phone and a power management module 122 coupled to DSP 102 manages power consumption within the phone. SDRAM 124 and flash memory 126 provide volatile and non-volatile memory, respectively, for applications processor 114. This arrangement of memory holds the code for the operating system, the code for customizable features such as the phone directory, and the code for any embedded applications software in the smartphone, including the voice recognition software described above. The visual display device for the smartphone includes an LCD driver chip 128 that drives an LCD display 130. There is also a clock module 132 that provides the clock signals for the other devices within the phone and provides an indicator of real time. All of the above-described components are packages within an appropriately designed housing 134.

The smartphone 100 described above represents the general internal structure of a number of different commercially available smartphones, and the internal circuit design of those phones is generally known in the art.

Figure 2:
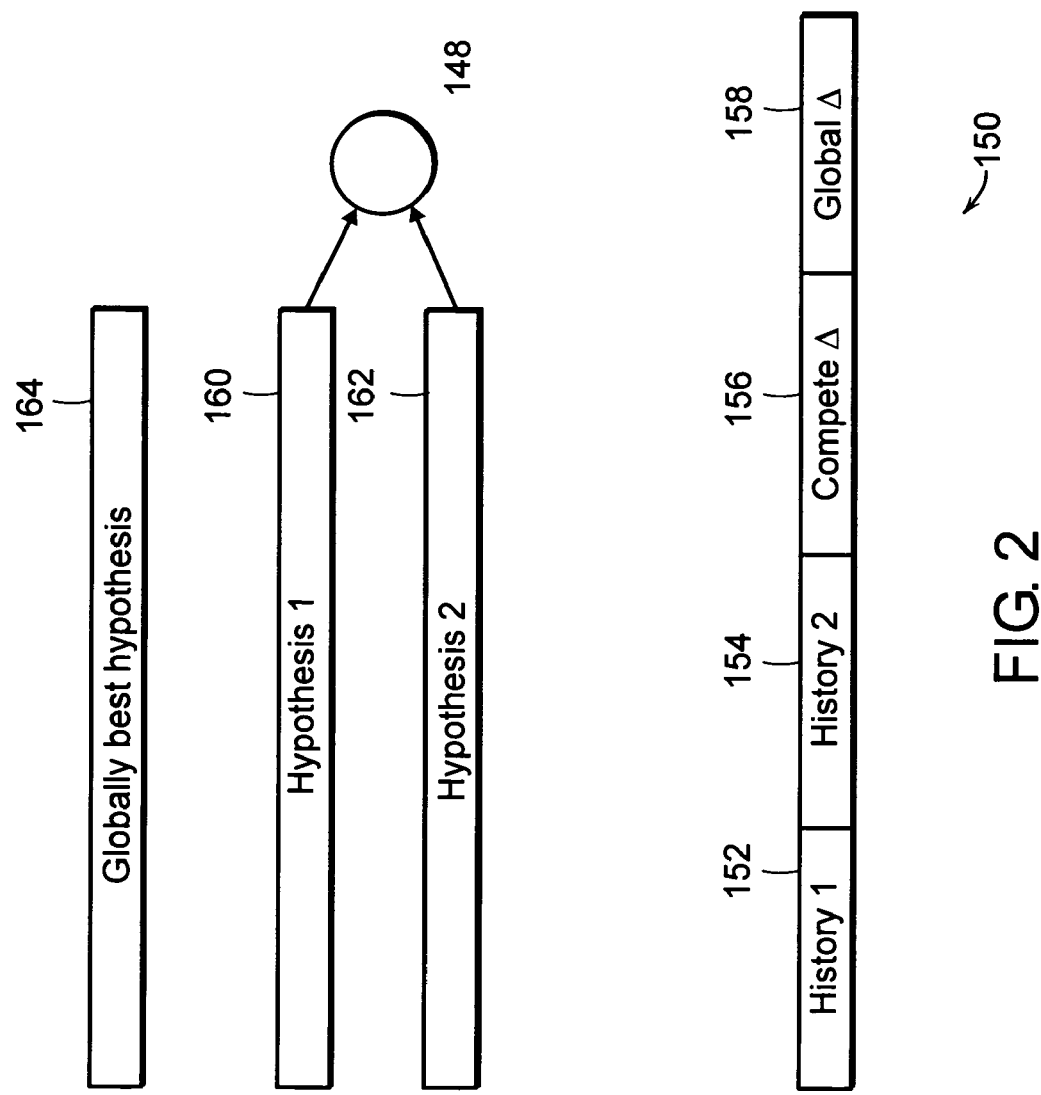
FIG. 2 illustrates a close call between competing hypotheses and the close call record data structure.

The voice recognition software operates by forming a number of hypotheses based upon stored acoustic models and, possibly, language models and input acoustic data. If language models are used, the scoring of hypotheses will be modified appropriately. The voice recognition software receives the input acoustic data and processes it on a frame-by-frame basis, where each frame represents a quantized sample of the analog acoustic information from the microphone. The voice recognition software updates the hypotheses for each frame of acoustic data. Each hypothesis includes a history of decoded words, and a score that provides a measure of how well the hypothesis matches the acoustic data received up to a given time. The hypothesis having the highest score (at a given time) with respect to the other hypotheses is referred to herein as the "globally best hypothesis." When the final state of a word is active, the software attempts to seed a subsequent word for that hypothesis. Occasionally the software will have two competing hypotheses 160 and 162 reach final word states at the same time, and have both hypotheses attempt to seed the same subsequent word 148 or final silence, as illustrated in FIG. 2. When this event occurs (referred to herein as a "close call"), the voice recognition software makes a close call record 150 in a close call list. A close call record 150 includes four components: the history 152 of the better scoring hypothesis 160, the history 154 of the worse scoring hypothesis 162, a competing score difference 156 and a global difference 158. The competing score difference 156 is the difference between the score of the better scoring competing hypothesis 160 and the score of the worse scoring hypothesis 162. The global difference 158 is the difference between the score of the globally best hypothesis 164 and the score of the worse scoring hypothesis 162.

When the software constructs two hypotheses that attempt to seed a common word, several consecutive frames will likely produce close calls. The voice recognition software does not permit more than one record for the same close call. The criterion the software uses to determine which record to keep is the global difference score, since the record with the best global difference score will most likely represent the acoustic frame at the actual beginning time of the next word. The software therefore keeps only the record with the better global difference and discards the record with the worse global difference.

Figure 3:
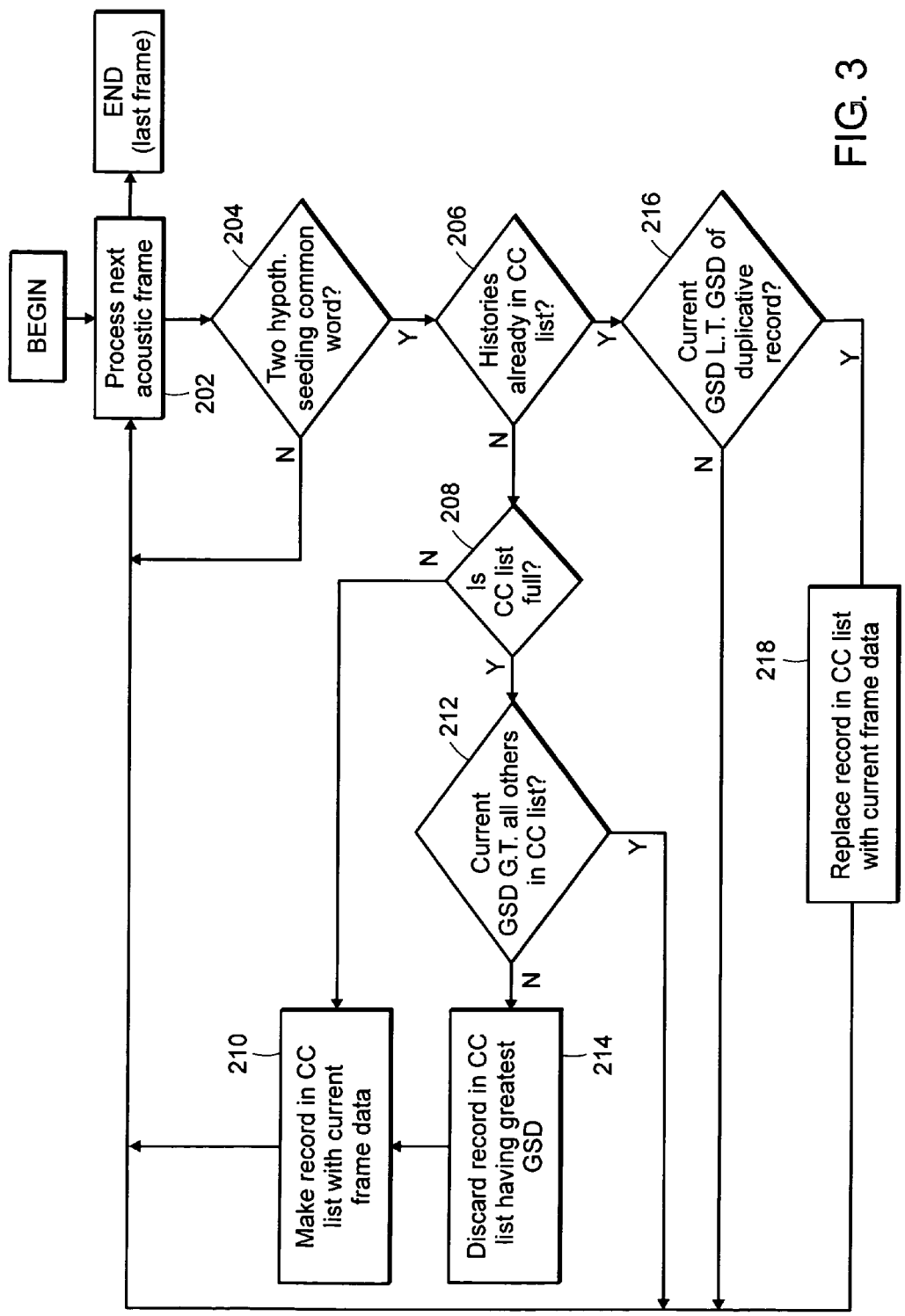
FIG. 3 shows, in flow diagram form, the generation of the close call list; and, FIG. 4 shows, in flow diagram form, the generation of the choice list.

FIG. 3 summarizes the generation of the close call list in flow-diagram form. After the software updates the hypotheses with respect to an acoustic frame 202, the software determines whether more than one hypothesis is seeding a common word 204. If not, the software continues on to the next frame. If so, the software determines whether a record for those competing hypotheses is already in the close call (CC) list 206. If no such record exists, the software determines whether the close call list is full 208. If the close call list is not full, the software creates a close call record in the close call list 210 corresponding to the current frame and continues on to process the next frame. If the close call list is full, the software determines whether the global score difference (GSD) corresponding to the competing hypotheses of the current frame is greater than all of the other records in the close call list 212. If it is, the software continues on to process the next frame. If at least one record in the close call list has a GSD that is greater than the GSD corresponding to the competing hypotheses of the current frame, the software discards the record in the close call list with the greatest GSD 214, creates a close call record in the close call list 210 corresponding to the current frame and continues on to process the next frame.

If the software determines that a record for the current competing hypotheses already exists in the close call list 206, the software then determines whether the GSD of the current competing hypotheses is less than the GSD of the duplicative record 216. If so, the software replaces 218 the duplicative record in the close call list with a record corresponding to the competing hypotheses of the current frame, and goes on to process the next frame. If the GSD of the current competing hypotheses is not less than the GSD of the duplicative record in the close call list, the software goes on to process the next frame. This process continues until the end of the utterance, i.e., there are no more frames to process.

The voice recognition software maintains the close call list having a preset maximum number of record entries. The number of records in the close call list depends upon the number of alternate decoded transcripts the user specifies. The number of records in the close call list typically ranges from N, the desired size of the choice list (including the globally best one), to 2N. If the close call list is full when a new record is ready for entry, the voice recognition software evaluates all of the records (including the new one) and discards the record with the lowest global score.

Figure 4:
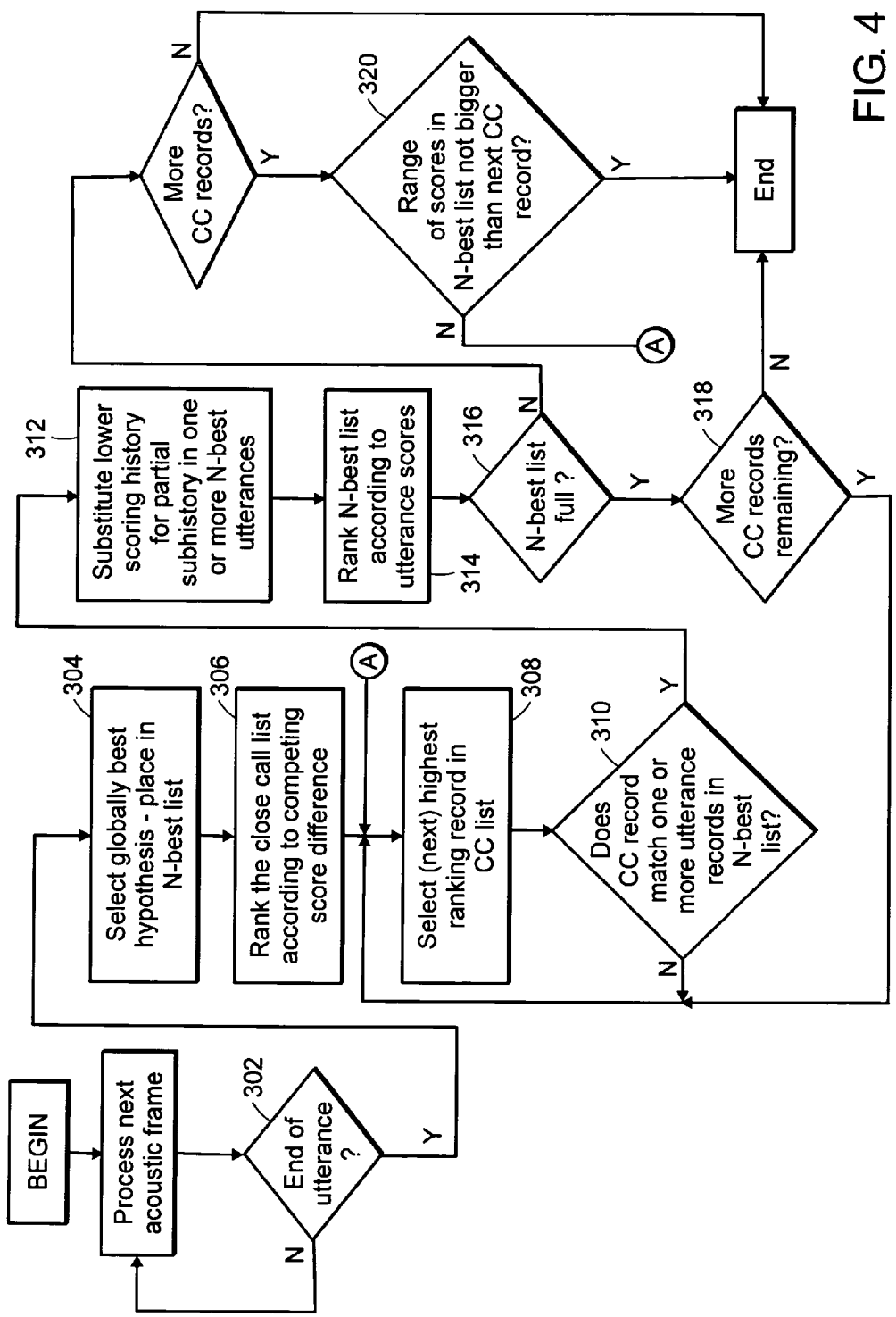

FIG. 4 summarizes the creation of the choice list. At the end of the utterance 302, the voice recognition software places the history of the globally best hypothesis of the utterance in a choice list 304. Alternatively, the voice recognition software can initialize the choice list with all the histories and scores of all paths ending with different final words, if the recognizer keeps track of that information. In the latter case, there is no need to record close calls seeding final silence in the forward pass of the recognizer. Also, if the software is recognizing with a constraint (e.g., only allowing particular words or numbers), the software only places records in the choice list with histories that can legally end according to the constraint. The voice recognition software ranks the records in the close call list based on the competing score difference 306, with the record having the smallest difference first and the record having the largest difference last.

Beginning with the first close call record 308, the speech recognition software determines whether the better scoring history from the record matches any sub-history within the globally best hypothesis 310. As used herein, a partial sub-history of a hypothesis is a beginning portion of that hypothesis. If the voice recognition software determines that the better scoring history matches a partial sub-history, the software creates a first alternate history by replacing the partial sub-history of the globally best hypothesis (i.e., those words corresponding to the better scoring history of the record) with the worse scoring history 312. The voice recognition software then calculates a score for the alternate history by subtracting the competing score difference from the score of the globally best hypothesis. If a language model was used during the speech recognition pass, the difference in language model scores between the original transcript and the new transcript is also subtracted from the score. The voice recognition software places this first alternate history into the choice list after the globally best history. Note that if the software does not find a match for the first record, the voice recognition software does not create an alternate history for the choice list, and moves on to the next record in the close call list. Note also that the number of words in the worse scoring history may or may not be the same as the better scoring history.

The voice recognition software moves on to the second highest-ranking close call record in the close call list and repeats the above-described process for each of the two histories in the choice list. Processing the second highest-ranking close call record creates as many as two additional alternate histories, depending upon whether the better scoring history of the close call record matches either or both of the beginning histories of the two histories in the choice list and whether the generated histories are unique. More specifically, the voice recognition software determines whether the better scoring history from the second close call record matches any partial sub-history of the globally best hypothesis. If the software determines that the better scoring history matches a partial sub-history, the voice recognition software creates a second alternate history by replacing the partial sub-history of the globally best hypothesis with the worse scoring history. The voice recognition software scores this second alternate history as described above, places this second alternate history into the choice list and orders the choice list 314 in descending order according to scores. The globally best history is first in the list, the alternate history with the best score is second and the alternate history with the next best score is third. If the transcript the software generates is already in the choice list, the software does not add new alternate transcript, but the software does replace the score of that existing choice list alternate transcript if the score of the duplicate transcript the software generates is better than the existing one. Also, if the software is recognizing with a constraint, then the software discards alternate transcripts generated in the construction of the choice list if they do not satisfy the constraint. Note also that once the software uses a record from the close call list to generate an alternate transcript, the software does not use that same record again on the generated transcript to generate a new transcript.

The voice recognition software then determines whether the better scoring history from the second close call record matches a partial sub-history of the first alternate history in the choice list. If the software determines that the better scoring history matches a sub-history histories, the voice recognition software creates a third alternate history by replacing the beginning history of the first alternate history with the worse scoring history of the close call record. The software scores and places this third alternate history in the choice list, and orders the choice list as described above in descending order according to scores.

The voice recognition software continues this matching process for each successive record in the close call list, further populating the choice list with more alternative histories, until it either exhausts the close call list or fills the choice list. If the voice recognition software exhausts the close call list 318, the process ends. If the software fills 316 the choice list before it exhausts the close call list, the voice recognition software will begin replacing entries on the choice list with alternatives from other close call records that prove to be better alternatives than others on the list 320. More specifically, if the score difference between the best and worst choices of the choice list is not bigger than the score difference of the next available entry in the close call list, the process ends. Otherwise the voice recognition software continues the above-described matching process, keeping only the N alternative histories with the best global differences in the choice list.

The smartphone 100 displays the recognized transcript and the alternative transcripts from the choice list on the LCD display 130. The smartphone user views the display 130 and either accepts the recognized utterance, or selects a more correct one of the alternative transcripts from the display 130.

The concepts described herein can also be implemented on other hand held platforms in addition to cellular phones or smartphones. Examples of other platforms include, without limitation, PDAs (Personal Digital Assistant) such as the Palm Pilot, the Blackberry and other handheld computing devices; pagers; and handheld notebook computers.

Other aspects, modifications, and embodiments are within the scope of the following claims.

What is claimed is:

1. A method of constructing a list of alternate versions of a recognized transcript, said method comprising:
   during speech recognition, generating a list of close call records, wherein each record includes histories for each of two competing partial hypotheses that seed a common word;
   adding the recognized transcript to a choice list;
   by using a processor selecting a record from the close call list;
   for each entry on the choice list,
   (a) determining whether one of the two histories for the selected record matches a partial subhistory of that entry on the choice list;
   (b) if one of the two histories for the selected record matches a partial subhisory of that entry, substituting the other of the two histories for the partial subhistory of that entry to generate an alternative version of the transcript; and,
   (c) adding the alternative version of the transcript to the choice list.

2. The method of claim 1, further comprising:
   selecting another record from the close call list; and,
   for each entry on the choice list, repeating steps (a) (b) and (c).

3. A method of constructing a list of alternate transcript from a recognized utterance, said method comprising
   generating a list of close call records, wherein each record includes history information and scoring information associated with a particular pair of partial hypotheses seeding a common word;
   generating one or more alternate transcripts from the list of close call records by evaluating each record in the list for a match between a partial sub-history of the recognized utterance and one of the histories stored in the record, and upon finding such a match, substituting the other of the histories stored in the record for the partial sub-history in the recognized transcript;
   by using a processor generating additional alternate transcripts by evaluating each record in the list of close call records for a match between a partial sub-history of each alternate utterance in the choice list and one of the histories stored in the record, and upon finding a match, substituting the other of the histories stored in the record for the partial sub-history in the alternate transcript; and,
   storing the one or more alternate transcripts and the additional alternate transcripts in a choice list.

4. A method according to claim 3, further including limiting the list of close call records to a preset maximum number of records.

5. A method of constructing a choice list of alternate versions of a recognized transcript from a speech recognition system, said method comprising:
   during speech recognition, generating a list of close call records, wherein each record includes histories for each of two competing partial hypotheses;
   initializing the choice list from at least one output of the speech recognition system;
   by using a processor selecting one of the close call records from the list of close call records;
   selecting a transcript from the choice list;
   determining whether one of the two histories for the selected record matches a partial subhistory of the transcript from the choice list;
   if one of the two histories for the selected close call record matches a partial subhistory of the transcript, substituting the other of the two histories for the partial subhistory of the transcript to generate an alternative version of the transcript; and,
   adding the alternative version of the transcript to the choice list.

6. The method of claim 5, wherein initializing the choice list involves initializing the choice list with the recognized transcript.

7. The method of claim 5, wherein initializing the choice list involves initializing the choice list with all active, legal word ending hypotheses.

8. The method of claim 5, further including comparing the close call record selected from the close call list against each transcript in the choice list.

9. The method of claim 5, further including limiting the list of close call records to a preset maximum number of close call records.

10. The method of claim 9, further including with each of the close call records, a close call score difference between the competitor hypothesis and the score of the globally best hypothesis at the time the close call record is added, the close call score difference being used to determine which close calls to keep if the preset number of close call records is reached.

11. The method of claim 5, further including generating a list of close call records, wherein each record includes histories for each of two competing word-ending partial hypotheses.

12. The method of claim 11, further including generating a list of close call records, wherein each record includes histories for each of two competing word-ending partial hypotheses, both seeding a common word.

13. The method of claim 5, further including generating a list of close call records wherein each of the close call records includes a close call score difference between the competing hypotheses, the score difference being used to construct the choice list.

14. The method of claim 13, further including computing a transcript score for each transcript in the choice list by adding the close call score difference to the transcript score of the transcript from the choice list into which the other of the two histories was substituted.

15. The method of claim 14, further including adding a difference between a language model score of the new transcript and the language model score of the transcript from the choice list into which the other of the two histories was substituted.

16. The method of claim 5, further including with each of the close call records, a first score and a second score, the first score being a close call score difference between the competing hypotheses, the second score being a global score difference between the competitor hypothesis and the score of a globally best hypothesis at the time the record is added, wherein the close call difference is used to construct the choice list, and the global score difference is used to determine which close calls to keep if the preset number of close call records is reached.

17. A method of constructing a list of alternate transcript from a recognized utterance, said method comprising:
   generating a list of close call records, wherein each record includes history information and scoring information associated with a particular pair of partial hypotheses seeding a common word;
   by using a processor generating one or more alternate transcripts from the list of close call records by evaluating each record in the list for a match between a partial sub-history of the recognized utterance and one of the histories stored in the record, and upon finding such a match, substituting the other of the histories stored in the record for the partial sub-history in the recognized transcript;

storing the one or more alternate transcripts in a choice list; and storing in the close call list for each pair of partial hypotheses seeding a common word (i) a history of a first partial hypothesis, (ii) a history of a second partial hypothesis, (iii) a score difference being a difference between a score of the first partial hypothesis and a score of the second partial hypothesis, and (iv) a global score difference being a difference between the score of a current best overall scoring hypothesis and the score of the second partial hypothesis.

18. A computer readable medium storing instructions adapted for execution on a processor, said instructions comprising:

instructions for generating, during speech recognition, a close call list of close call records, wherein each record includes histories for each of two competing partial hypotheses;

instructions for initializing the choice list from at least one output of the speech recognition system;

instructions for selecting one of the close call records from the close call list;

instructions for selecting a transcript from the choice list;

instructions for determining whether one of the two histories for the selected record matches a partial subhistory of the transcript from the choice list;

instructions for substituting the other of the two histories for the partial subhistory of the transcript to generate an alternative version of the transcript, if one of the two histories for the selected close call record matches a partial subhistory of the transcript; and, instructions for adding the alternative version of the transcript to the choice list.

19. A method of constructing a list of alternate transcripts from a recognized transcript, comprising:

providing two or more partial hypotheses of an acoustic transcript;

for each pair of partial hypotheses characterized by a first partial hypothesis having an associated first score and a second partial hypothesis having an associated second score being less than the first score, both ending at a common time and both seeding a common continuation word, evaluating by using a processor the first partial hypothesis and the second partial hypothesis at each acoustic frame following the seeding of the common continuation word, and storing in a close call list a record of the first and second partial hypotheses, the record corresponding to the acoustic frame resulting in a smallest score difference between a current best overall scoring hypothesis and the second score, wherein the record includes at least (i) a history of the first partial hypothesis, (ii) a history of the second partial hypothesis, (iii) a score difference being a difference between the first score and the second score, and (iv) a global score difference being a difference between the current best overall scoring hypothesis and the second score; and, generating one or more alternate hypotheses by combining information from at least one record in the close call list with the recognized transcript.

20. A method of constructing a list of alternate utterance hypotheses from a complete utterance hypothesis, comprising:

providing two or more partial hypotheses of an acoustic utterance;

for each pair of partial hypotheses characterized by a first partial hypothesis having an associated first score and a second partial hypothesis having an associated second score being less than the first score, both ending at a common time and both seeding a common continuation word, evaluating by using a processor the first partial hypothesis and the second partial hypothesis at each acoustic frame following the seeding of the common continuation word, and storing in a close call list a record of the first and second partial hypotheses, the record corresponding to the acoustic frame resulting in a smallest score difference between a current best overall scoring hypothesis and the second score, wherein the record includes at least (i) a history of the first partial hypothesis, (ii) a history of the second partial hypothesis, (iii) a score difference being a difference between the first score and the second score, and (iv) a global score difference being a difference between the current best overall scoring hypothesis and the second score;

for each acoustic frame, updating the two or more partial hypotheses until the acoustic utterance ends, and selecting a best scoring complete hypothesis;

evaluating the records in the close call list for potential alternate utterance hypotheses, beginning with a record in the close call list having a smallest score difference and subsequently with each record in the close call list in an order of ascending score difference, by:

(i) comparing a set of first words from the first hypothesis and a set of first words from one or more complete hypotheses from a choice list;

(ii) if a set of first words from a history of the first partial hypothesis matches a set of first words from one or more complete hypotheses from the choice list, substituting the history of the second partial hypothesis for the history of the first partial hypothesis within the one or more complete hypotheses from the choice list so as to generate one or more alternate utterance hypotheses, and placing the alternate hypotheses in the choice list; and, (iii) continuing evaluating the records in the close call list until filling the choice list.

21. A method according to claim 20, further including providing a close call list having a capacity for a preset maximum number of records.

22. A method according to claim 20, further including providing a choice list having a capacity for a finite number of alternate transcripts.

23. A method according to claim 20, further including comparing the set of first words of the history of the first partial hypothesis to the set of words from the complete utterance hypothesis, wherein the set of words from the complete utterance hypothesis includes all of the words from the first partial hypothesis.

24. A method according to claim 20, further including comparing the global score of a highest ranking record remaining in the close call list with the lowest scoring hypothesis in the choice list, and generating at least one further alternate utterance hypothesis if the global score of the highest ranking record remaining in the close call list is better than the score difference between the best and worst scoring hypotheses in the choice list.

25. A method of creating an alternate utterance hypothesis from a complete utterance hypothesis, comprising:

for a first partial hypothesis having an associated first score and a second partial hypothesis having an associated second score being less than the first score, both ending at a common time and both seeding a common continuation word, storing information characterizing the first partial hypothesis and the second partial hypothesis at each frame following the seeding of the common continuation word, the information including at least a history of the first partial hypothesis and a history of the second partial hypothesis;

by using a processor comparing a set of first words from the first hypothesis and a set of first words from the complete utterance hypothesis;

if a set of first words from the history of the first partial hypothesis matches a set of first words from the complete utterance hypothesis, substituting the history of the second partial hypothesis for the history of the first partial hypothesis within the complete utterance hypothesis; and storing information characterizing the first and second partial hypotheses that include (i) a history of the first partial hypothesis, (ii) a history of the second partial hypothesis, (iii) a score difference being a difference between the first score and the second score, and (iv) a global score difference being a difference between the score of a globally best hypothesis and the second score.

26. A method according to claim 25, further including generating the first score and the second score based at least upon input acoustic data and a set of language models.

27. A method according to claim 25, further including comparing the set of first words of the history of the first partial hypothesis to the set of words from the complete utterance hypothesis, wherein the set of words from the complete utterance hypothesis includes all of the words from the first partial hypothesis.

28. A computer readable medium storing instructions adapted for execution on a processor, said instructions comprising:

instructions for generating a list of close call records, wherein each record includes history information and scoring information associated with a particular pair of partial hypotheses seeding a common word;

instructions for generating one or more alternate transcripts from the list of close call records by evaluating each record in the list for a match between a partial sub-history of the recognized transcript and one of the histories stored in the record, and upon finding such a match, substituting the other of the histories stored in the record for the partial sub-history in the recognized transcript;

instructions for generating additional alternate transcripts by evaluating each record in the list of close call records for a match between a partial sub-history of each alternate utterance in the choice list and one of the histories stored in the record, and upon finding a match, substituting the other of the histories stored in the record for the partial sub-history in the alternate transcript; and instructions for storing the one or more alternate transcripts and the additional alternate transcripts in a choice list.

29. The computer readable medium of claim 28, wherein the medium is disposed within a mobile telephone apparatus and operates in conjunction with a user interface.

30. The computer readable medium of claim 28, wherein the medium is disposed within a handheld electronic apparatus and operates in conjunction with a user interface.

* * * * *